US012010482B2

(12) United States Patent
Trewartha et al.

(10) Patent No.: US 12,010,482 B2
(45) Date of Patent: Jun. 11, 2024

(54) MICROPHONE ISOLATION MOUNT

(71) Applicant: Freedman Electronics Pty Ltd, Silverwater (AU)

(72) Inventors: Samuel Dean Trewartha, Silverwater (AU); Chris Woolf, Silverwater (AU)

(73) Assignee: Freedman Electronics Pty Ltd, Silverwater (AU)

( * ) Notice: Subject to any disclaimer, the term of this patent is extended or adjusted under 35 U.S.C. 154(b) by 134 days.

(21) Appl. No.: 17/891,371

(22) Filed: Aug. 19, 2022

(65) Prior Publication Data

US 2024/0064459 A1 Feb. 22, 2024

(51) Int. Cl.
*H04R 1/08* (2006.01)
*H04R 1/28* (2006.01)

(52) U.S. Cl.
CPC ............. *H04R 1/2892* (2013.01); *H04R 1/08* (2013.01)

(58) Field of Classification Search
CPC ................................ H04R 1/2892; H04R 1/08
See application file for complete search history.

(56) References Cited

U.S. PATENT DOCUMENTS

| | | | | |
|---|---|---|---|---|
| 9,560,433 | B2 * | 1/2017 | Parker | H04R 1/08 |
| 9,843,852 | B2 * | 12/2017 | Mcgovern, Jr. | F16F 7/14 |
| 10,567,870 | B2 * | 2/2020 | Heine | H04R 1/083 |
| 2009/0016558 | A1 | 1/2009 | Woolf et al. | |

OTHER PUBLICATIONS

Rycote Shock Mounts and Suspension. Rode Website: https://mymic.rycote.com/products/shock-mounts-suspension/. Last accessed Aug. 19, 2022.

* cited by examiner

*Primary Examiner* — Brian Ensey
(74) *Attorney, Agent, or Firm* — Lathrop GPM LLP; Richard Beem; Alex Shtraym

(57) ABSTRACT

The present invention relates generally to microphone mounts and more particularly to an isolation mount for a microphone having an address axis. The isolation mount may include a base configured to attach to an object, a mounting assembly adapted to securely receive the microphone, and a suspension element extending between the base and the mounting assembly. The suspension element may include a first end affixed to the base, a second end affixed to the mounting assembly and a rolling spring extending therebetween, wherein the rolling spring is arranged to form an arc having an opening substantially aligned to the address axis of the microphone. Advantageously, the isolation mount may be configured to have a lowered resonant frequency, to provide a high level of compliance in at least one direction, and to provide a greater degree of energy absorption.

20 Claims, 13 Drawing Sheets

MICROPHONE ISOLATION MOUNT

FIELD OF THE INVENTION

The present invention relates to the field of microphone mounts, and more particularly to a microphone isolation mount for reducing and/or preventing the detection of vibrations.

FIELD OF THE INVENTION

Because sound is transmitted as a series of pressure waves through air, a common form of microphones used across multiple industries and technologies includes a diaphragm to detect these pressure waves. The changes in pressure cause the diaphragm to flex, and this flexion is converted into a signal by the microphone. This signal may then be transmitted to a speaker, for example, whereupon it can be converted back into sound.

However, a number of external sources, other than sound, may induce movement or flexion within the microphone diaphragm. As the microphone cannot differentiate between the sources of diaphragm flexion, all flexion of the diaphragm is captured as a signal representative of sound, even flexion caused by the external sources other than sound.

Further, other external sources that may induce movement within the microphone diaphragm may be caused by the microphone being bumped, nudged, impacted or otherwise knocked and where shock force is applied to the object supporting the microphone. Importantly, low level vibrations can also result in flexion of the microphone diaphragm. These and other external sources are broadly referred to herein as "non-sonic vibrations".

All of these non-sonic vibrations recorded by the diaphragm and misidentified as sound are typically transmitted into the microphone body from the object to which the microphone is mounted. These objects may include microphone stands, microphone booms, or a ceiling mount, as typically employed in some recording studios.

One conventional way of preventing a microphone from misidentifying these non-sonic vibrations as sound is to mount the microphone to an isolation mount, which may comprise a mounting bracket suspended on one or more suspension spring elements, together with a method (integral or otherwise) of damping the displacement of the spring elements.

This is mechanically described as a mass-spring-damper system, wherein the microphone and/or the object to which the microphone is mounted functions as the mass, the suspension element functions as the spring to absorb non-sonic vibrations, and there are one or more damping elements that release, or dissipate, the absorbed kinetic energy of said non-sonic vibrations (typically as heat). Some isolation mounts are designed such that their suspension elements have inherent or integral damping due to the physical properties of the material and/or its shape, while others use a separate damping element in mechanical communication with the suspension element.

In designing a microphone isolation mount, it is desirable to design a mount with a low resonant frequency. The resonant frequency of the suspension element of the isolation mount may be indicative of the lower frequency bound of vibrations that the suspension element may successfully absorb. As such, one generally wants to design an isolation mount to have a resonant frequency that is as low as possible.

One example of a conventional isolation mount is illustrated in FIG. 1. As shown, conventional mount includes one or more elastic cords as suspension springs. When properly arranged, such a system may facilitate partially absorbing of shock forces from multiple directions. As may be appreciated by the skilled person, this prior art system relies on the elastic extension and contraction of the supporting cords to permit displacement along any axis, and thus absorption of the displacing force.

Such prior art systems, however, often suffer from some drawbacks. As the skilled person will appreciate, the suspension elements must provide both structural support for the mounted microphone, and must also function as a mass-spring-damper system in order to enable isolation. In providing 'omnidirectional' isolation, the cords must provide both flexion and support for the microphone equally in all direction. As such, it is impossible to prevent displacing forces being translated across axes, thus causing the microphone to wobble. In other words, the isolation mount of FIG. 1 can only hold a microphone stable by being relatively stiff. This necessitates a high tension, which often raises the resonant frequency of the mount, which in turn raises the minimum effective frequency for which the mount can operate. Such mounts also suffer from the elastic having little integral damping—the mounts therefore tend to oscillate for long periods in response to a shock force, such as when the microphone or mount is knocked or bumped by a user, for example.

Another example of a conventional isolation mount is disclosed in United States patent publication no. US 2009/0016558 and illustrated in FIG. 2. As shown, conventional isolation mount may include improved support for the microphone without sacrificing the isolation properties of the mount. Mount may be configured to provide preferential or directional isolation. By providing isolation along only particular axes (typically the axes that will cause a microphone diaphragm to flex), mount can support securely along the other axes, thus keeping it stable. As will be appreciated by the skilled person, the mount as shown in FIG. 2 provides isolation along essentially one axis (that being the long axis of the microphone).

Yet another example of a conventional isolation mount is shown in FIG. 3. As will be appreciated by the skilled person, the embodiment of isolation mount shown in FIG. 3 provides shock isolation in multiple axes by utilizing multiple suspension elements, each having an individual preferential axis.

The prior art isolation mounts depicted in both FIGS. 1B and 1C may rely upon a rocking motion to isolate the mounted microphone from undesired external forces (including low level vibrations and shock forces) that may be transferred to the microphone from the object to which it is mounted. The recurved arms flex back and forth (and additionally side to side in the case of FIG. 1C, since the arms are offset), thereby absorbing at least a part of the kinetic energy of the undesired external forces, thereby minimizing any vibration being detected by the microphone diaphragm as sound. A visual depiction of the rocking motion of the isolation mount of FIG. 1B is shown in FIG. 2.

This form of isolation mount, sold under the trade name of "Lyre" mount, suffers from the difficulty in ensuring that displacement is evenly distributed across the recurved arm length. Further, as a result of the 'rocking' motion, longitudinal movement of the isolation mount relative to the microphone may also translate in a lateral or vertical movement. This may reduce the effectiveness of such isolation mounts by permitting some undesired translation of forces across axes, to the detriment of stability. Furthermore, the large size and profile of the recurved arm of conventional mounts may not be desirable.

Accordingly, there is a need for an isolation mount that overcomes one or more of the disadvantages of the prior art. In particular, there is a need for an isolation mount that is configured to have a lowered resonant frequency, that is configured to provide a high level of compliance (and therefore isolation) in at least one direction without sacrificing the ability of the mount to support the microphone, and that is configured to provide a greater degree of energy absorption than conventional directional isolation mounts.

SUMMARY OF THE INVENTION

In one aspect, an isolation mount for a microphone having an address axis may include a base configured to attach to an object, a mounting assembly adapted to securely receive the microphone therein, and a suspension element extending between the base and the mounting assembly, the suspension element comprising a first end affixed to the base, a second end affixed to the mounting assembly and a rolling spring extending therebetween, wherein the rolling spring is arranged to form an arc having an opening substantially aligned to the address axis of the microphone.

The suspension element may further include a first and second rolling spring and the rolling spring bodies are arranged such that their respective arc openings are substantially aligned to the address axis of the microphone in opposing directions. The first rolling spring may be positioned substantially above the second rolling spring. Alternatively, the first rolling spring may be substantially coplanar with the second rolling spring.

Further, the rolling spring may be configured such that the formed arc is substantially coplanar with the address axis.

Moreover, the first and second rolling spring bodies may be configured such that their respective formed arcs are individually coplanar with the address axis. Alternatively, the first and second rolling spring bodies may be configured such that a first moment induced within the first rolling spring may be substantially cancelled by a second opposing moment induced within the second rolling spring.

In another aspect, a first and second isolation mount may be arranged to attach to and support a microphone at multiple points along the address axis. The first and second isolation mounts may share a common base. Further, the first and second isolation mounts may share a common mounting assembly.

In yet another, the microphone has two perpendicular address axes forming an address plane, the suspension element may be a plurality of suspension elements each extending between the base and the mounting assembly, arranged such that the arc openings of their respective rolling spring bodies may be aligned with the address plane in an array of directions. The plurality of suspension elements may be radially arranged about the mounting assembly. Alternatively, the plurality of suspension elements may be arranged in a nested configuration, whereby a sequential chain is formed by the plurality of suspension elements between the base and the mounting assembly.

It is further contemplated that the suspension element may be a ribbon having a width oriented substantially perpendicular to the address axis.

BRIEF DESCRIPTION OF THE DRAWINGS

Embodiments are illustrated by way of example and not limitation in the figures in the accompanying drawings, in which like references indicate similar elements and in which.

Figure 10A:
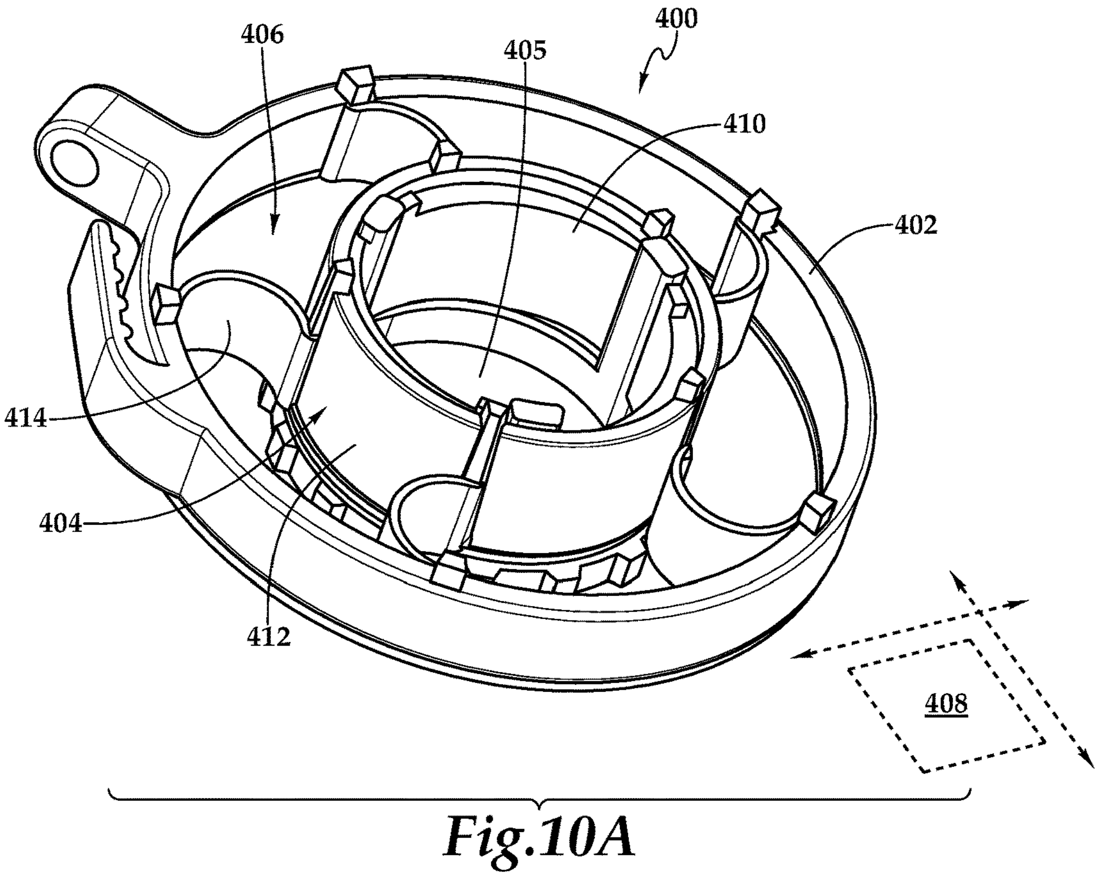
Figure 10B:
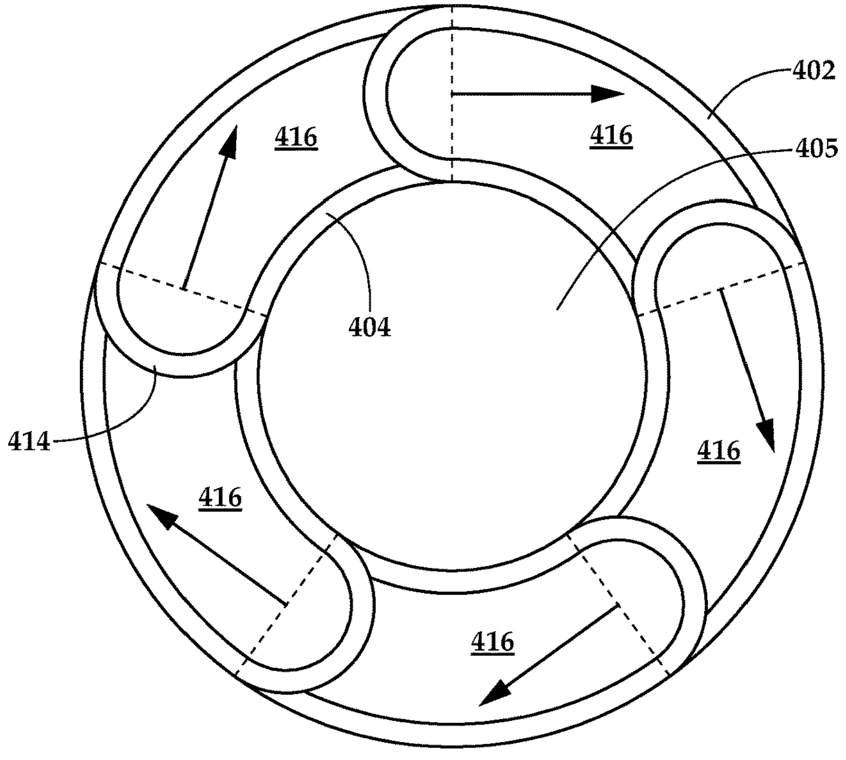
Figure 11:
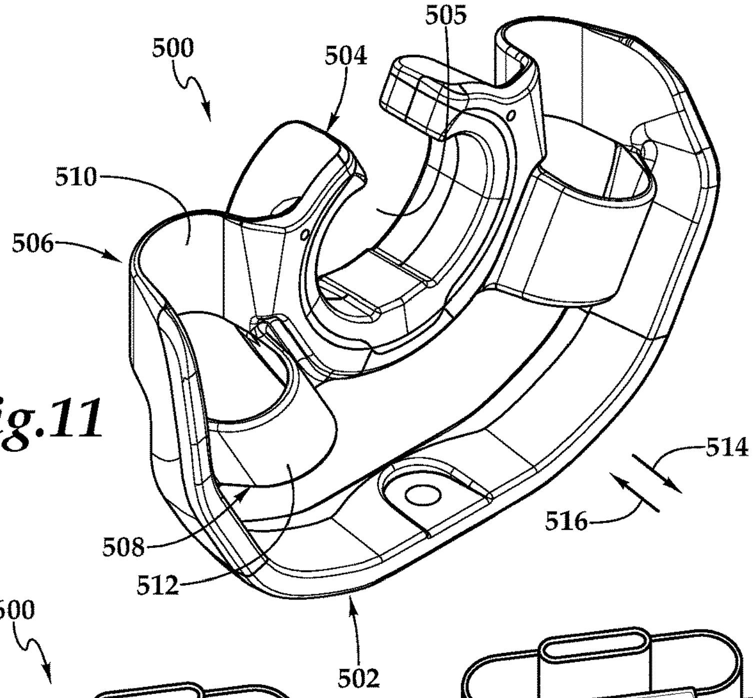
Figure 12:
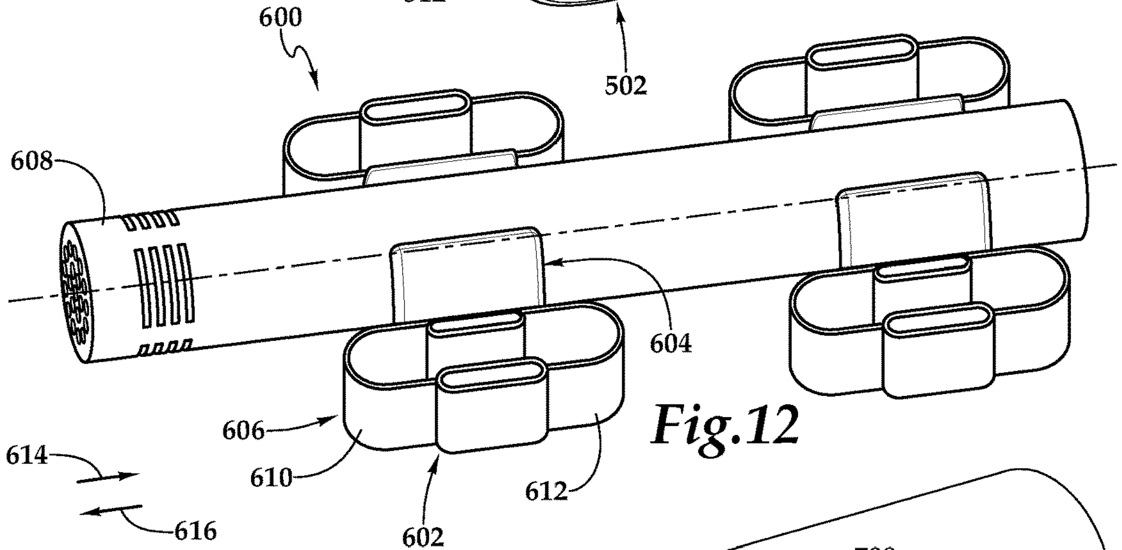
Figure 13:
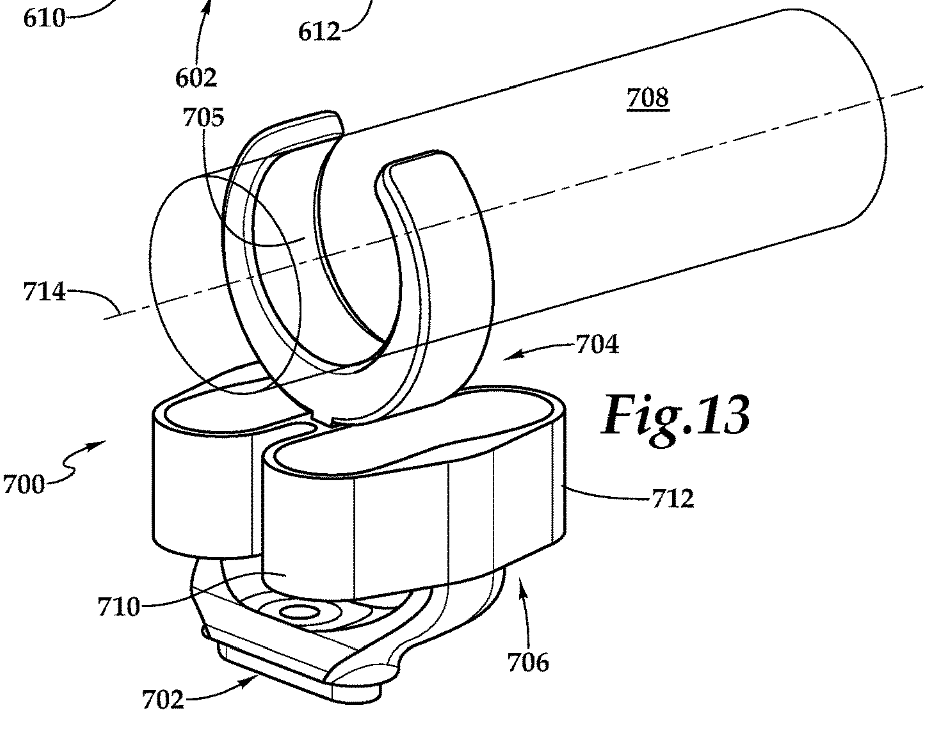
Figure 14:
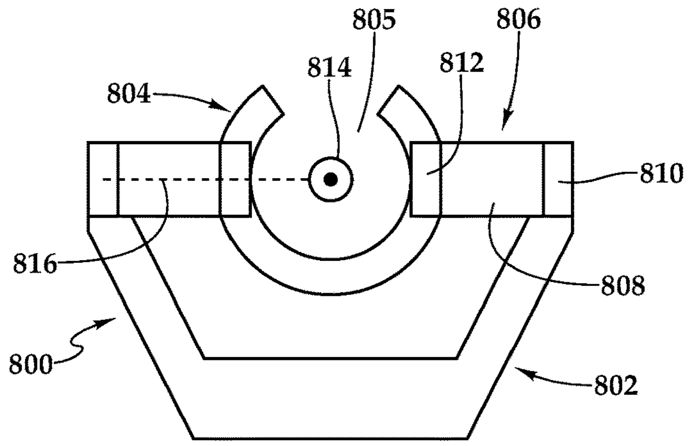
Figure 15A:
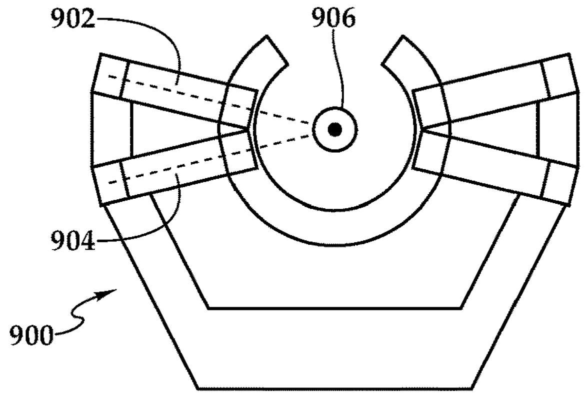

FIG. TOA illustrates an exemplary isolation mount including a plurality of suspension elements arranged radially around a mounting assembly;

FIG. 10B illustrates an exemplary movement of the suspension elements of FIG. 10A;

FIG. 11 illustrates an exemplary isolation mount including opposing suspension elements;

FIG. 12 illustrates another exemplary isolation mount including opposing suspension elements;

FIG. 13 illustrates yet another exemplary isolation mount including opposing suspension elements;

FIG. 14 illustrates a front view of an exemplary isolation mount;

FIG. 15A illustrates an exemplary isolation mount having overlaying rolling springs.

Figure 15B:
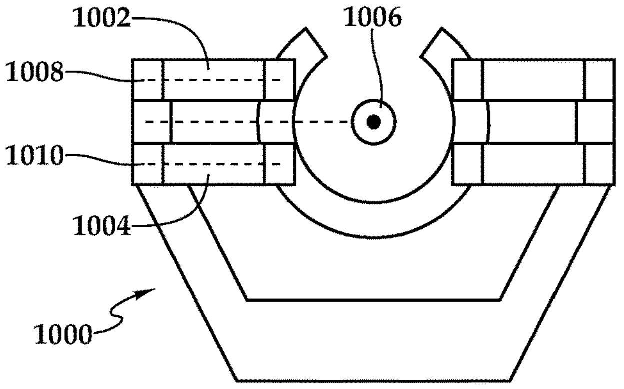
Figure 16:
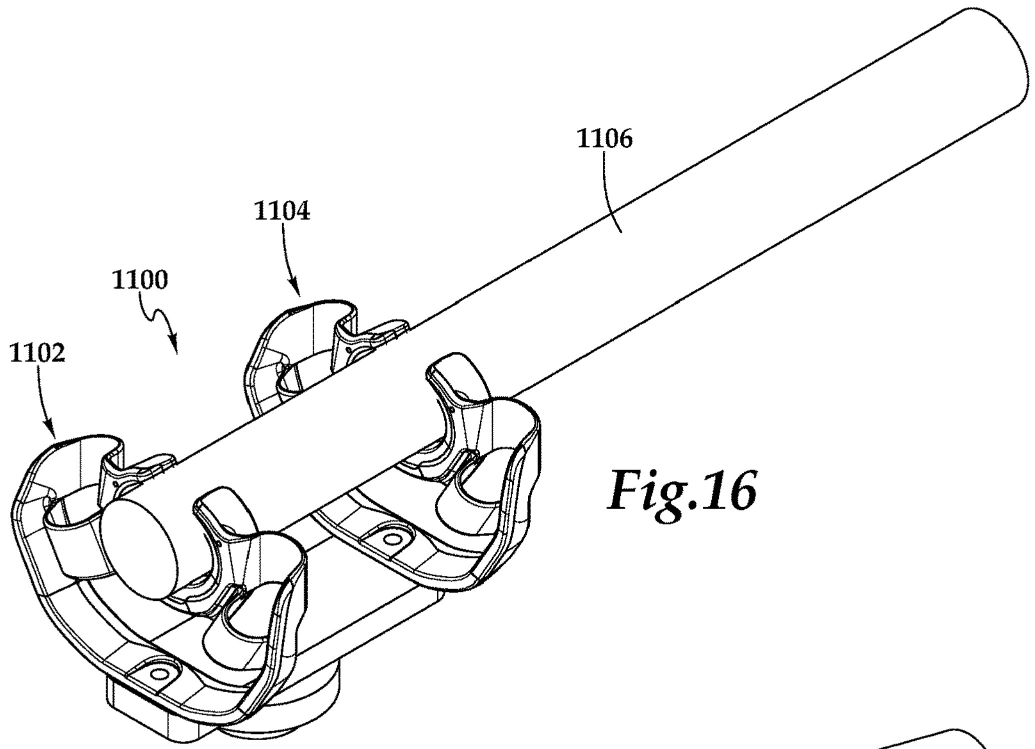
Figure 17:
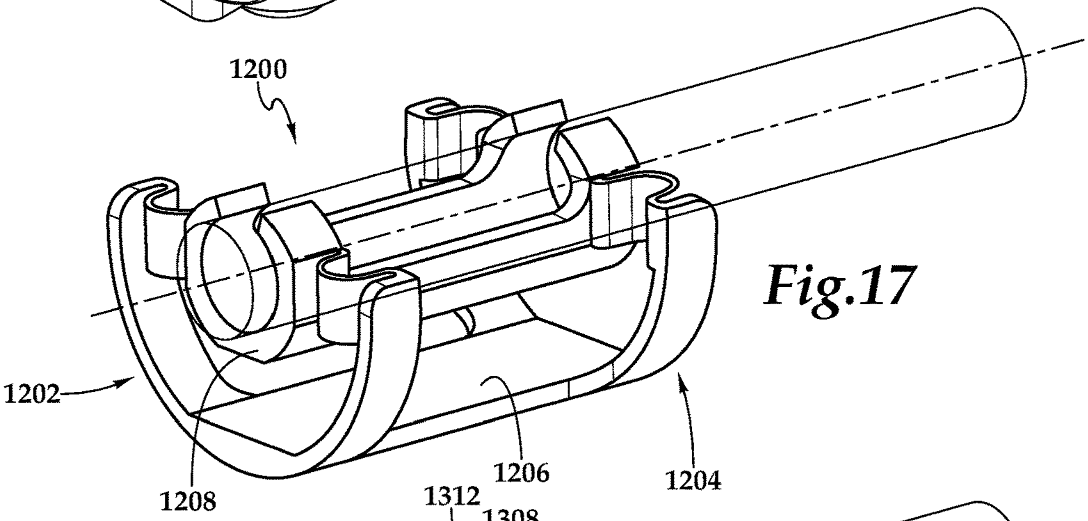
Figure 18:
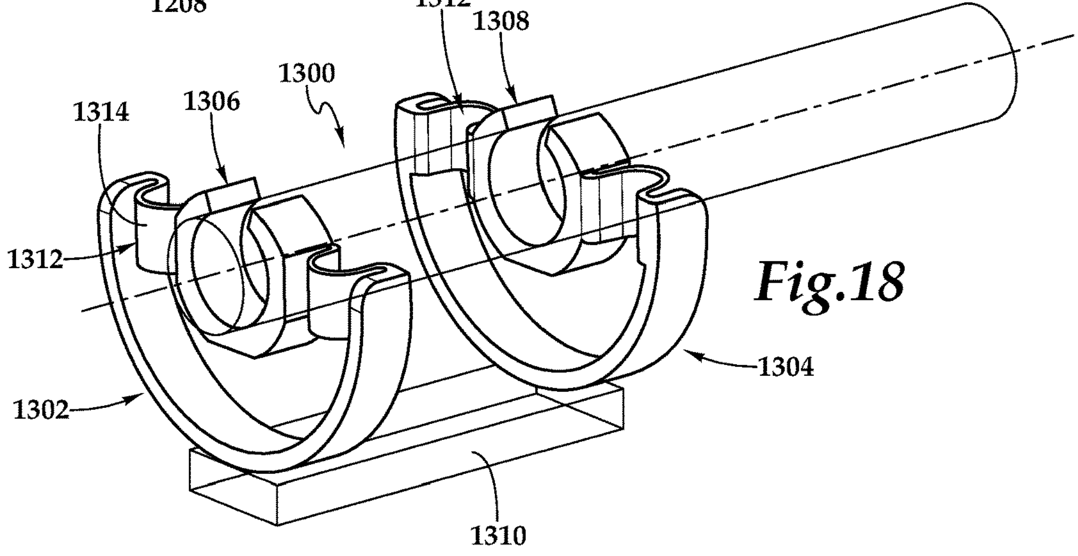
Figure 19:
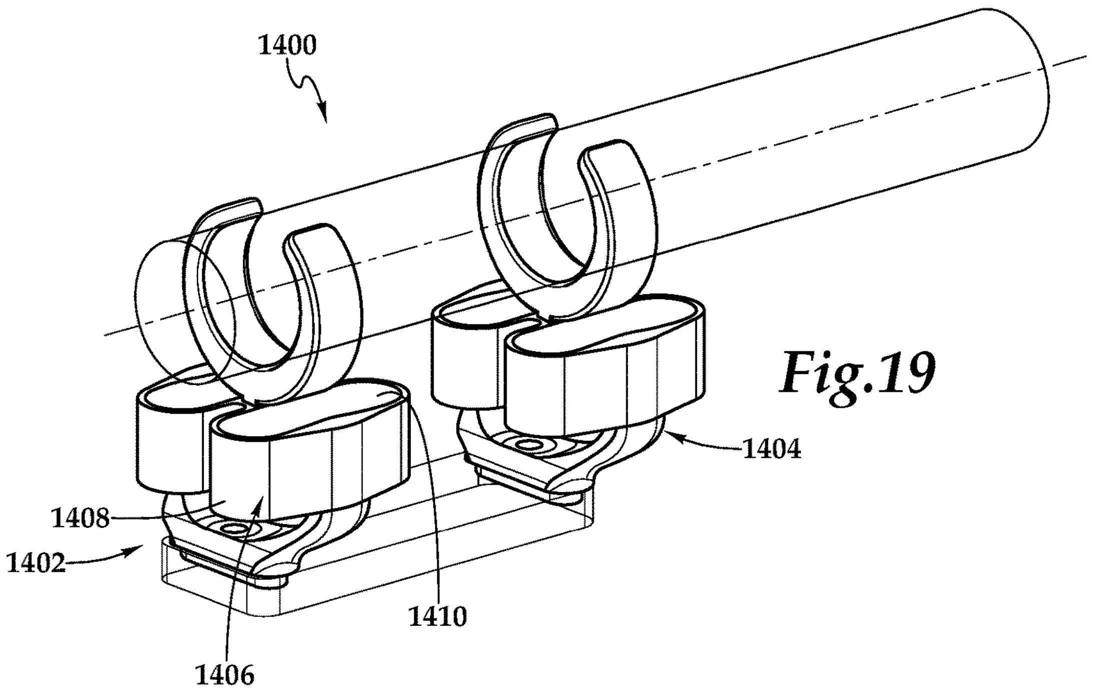
Figure 20:
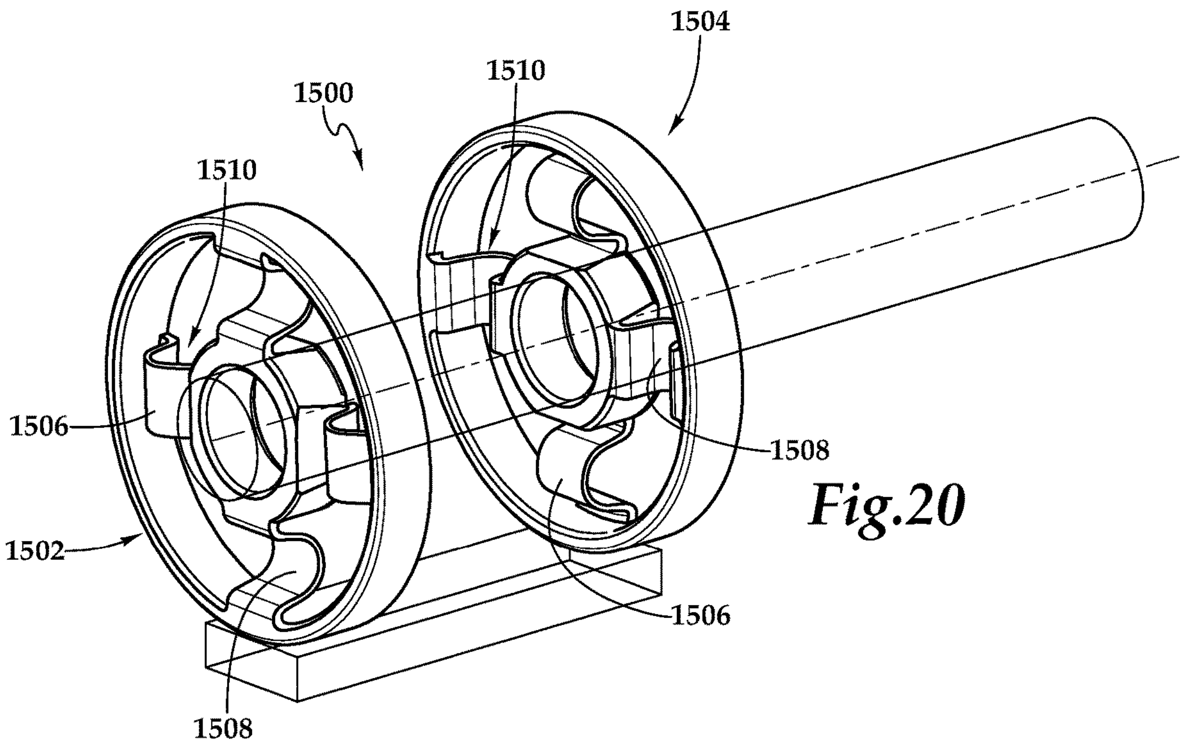
Figure 21:
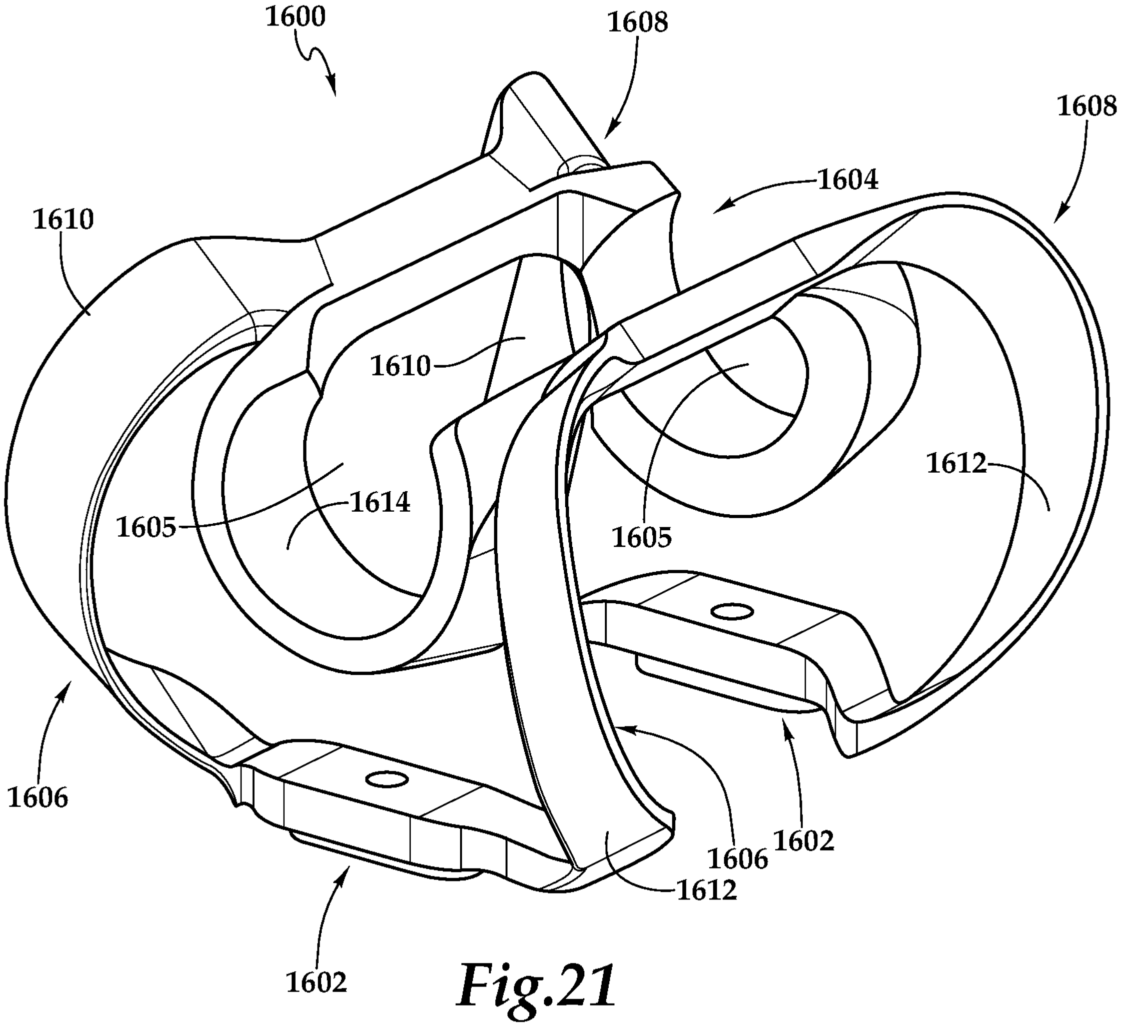
Figure 22:
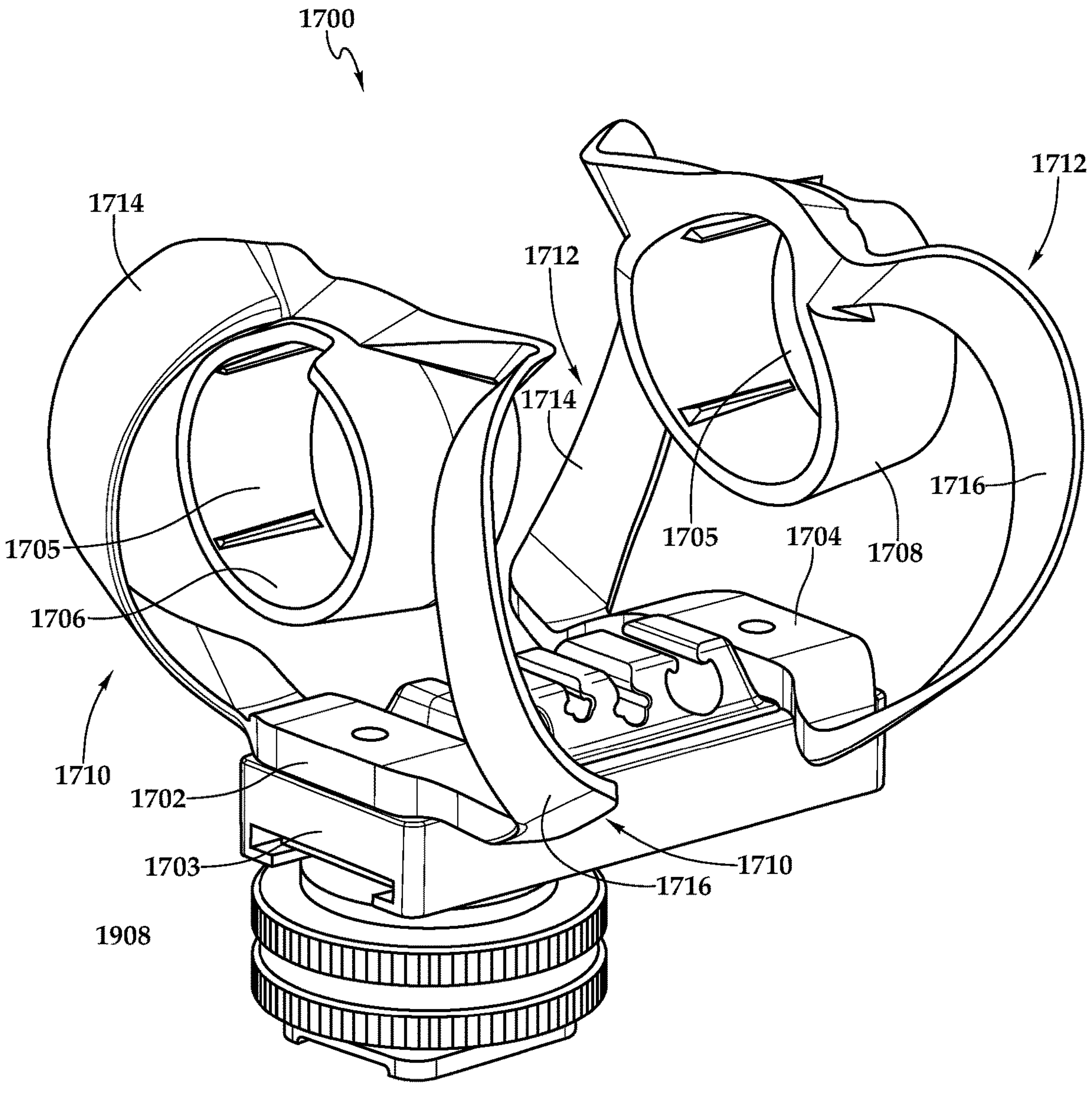

FIG. 15B illustrates an exemplary isolation mount having rolling springs arranged such that the average of the planes may be coplanar with an address axis of a microphone;

FIG. 16 illustrates an exemplary system including two isolation mounts;

FIG. 17 illustrates an exemplary system including two isolation mounts that may share a common mounting assembly;

FIG. 18 illustrates an exemplary system including two isolation mounts that may share a common base;

FIG. 19 illustrates an exemplary system including two isolation mounts having suspension elements with opposing rolling springs;

FIG. 20 illustrates an exemplary system including two isolation mounts having suspension elements with opposing rolling springs arranged to form arcs opening in substantially opposing directions;

FIG. 21 illustrates an exemplary isolation mount including suspension elements having a long ribbon structure;

FIG. 22 illustrates an exemplary isolation mount with separate suspension elements, each suspension element including a long ribbon structure.

Figure 23:
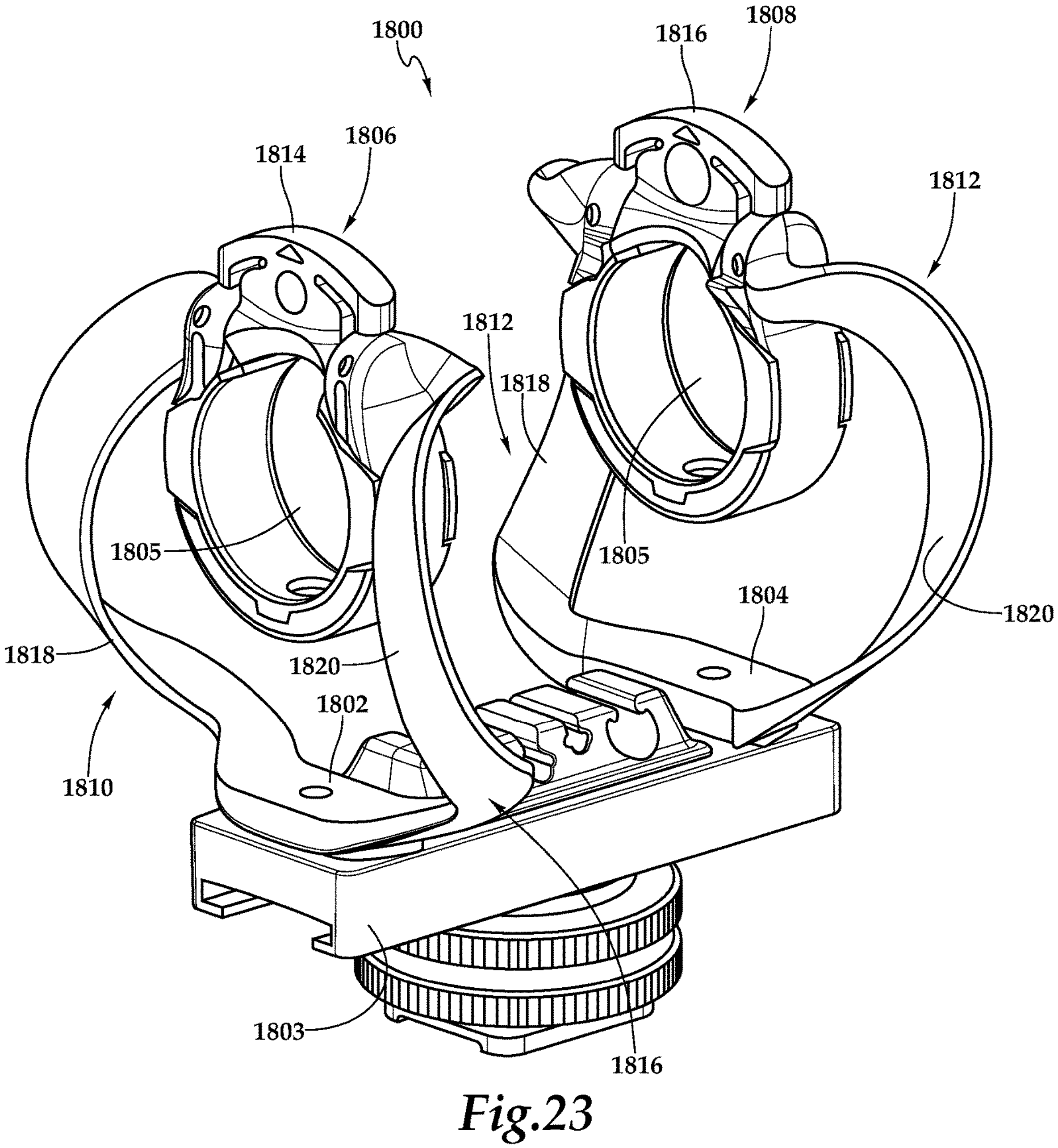
Figure 24:
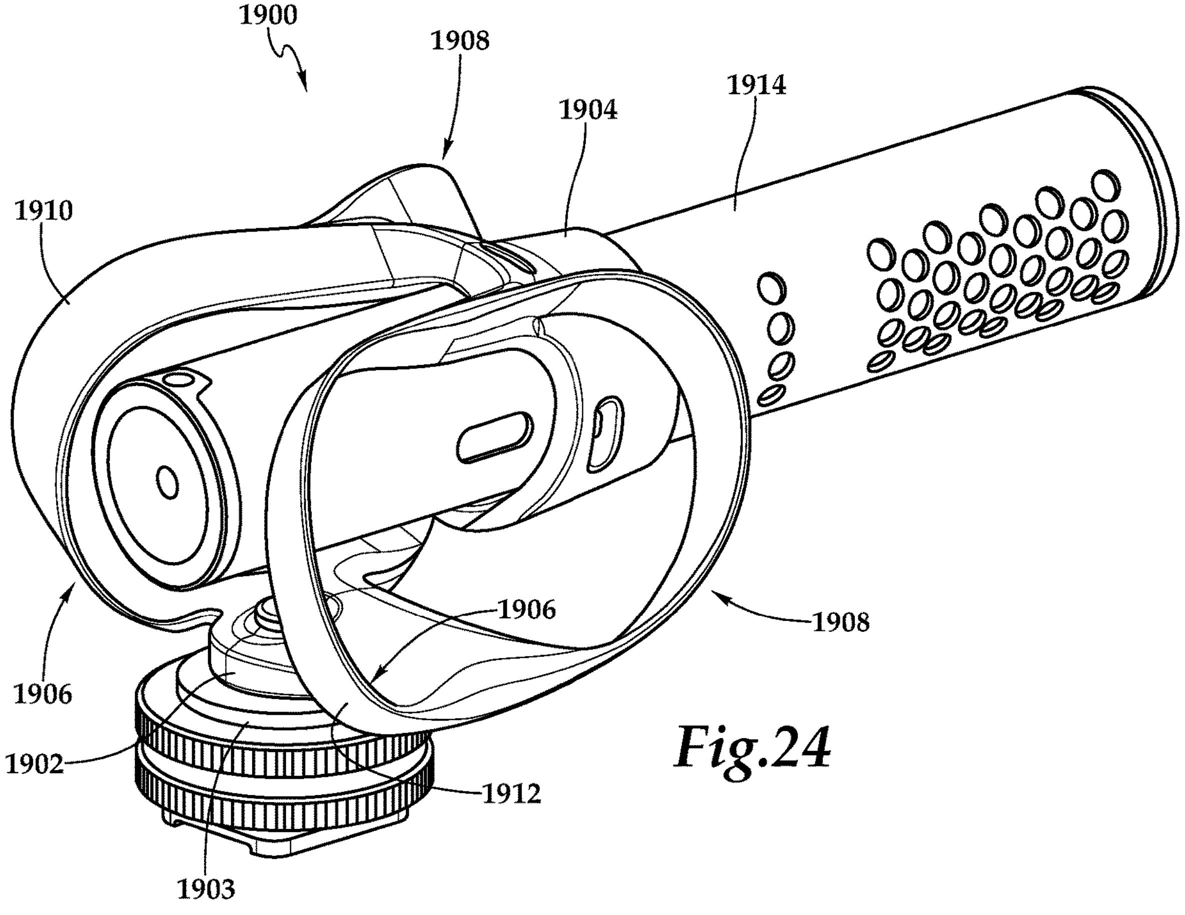

FIG. 23 illustrates an exemplary isolation mount having mounting assemblies with a toggle and suspension elements having a long ribbon structure; and FIG. 24 illustrates an exemplary isolation mount including suspension elements that may share a common base.

DEFINITIONS AND EXPLANATORY EXAMPLES

For purposes of this application, the term "kinetic energy" refers to energy from any source of vibration or movement (other than air-borne sound) that can be transmitted to create movement of the diaphragm of a microphone, relative to its backplate or structure, and mistakenly recorded or identified as sound.

For purposes of this application, the term 'non-sonic vibration' refers to external forces, other than sound, that may induce vibration, shifting or other forms of movement in a microphone diaphragm and will be incorrectly detected as sound due to movement of the microphone diaphragm. For instance, non-sonic vibrations may include shock forces such as a microphone or the microphone base being bumped, knocked or otherwise receiving an impact, or other vibration sources such as machinery, footsteps, or similar. Furthermore, as used herein the term should be understood to not only apply to non-sonic vibrations that are directly applied to the microphone, microphone mount or an object that the microphone is mounted to, but also to non-sonic vibrations that may be transmitted to one of the above.

For purposes of this application, the terms "address axis" and "address plane" refer to the directions for which a microphone may be designed to pick up sound. A microphone having an address axis is typically configured to be directional, and to preferentially detect sounds only from a particular direction that substantially extends along the address axis, or otherwise at an acute angle to the address axis (less than 45°). On the other hand, a microphone having an address plane may be configured, or may be mounted, to detect sounds from directions within any angle on the address plane. This may be through the use of multiple diaphragms, through the microphone being able to rotate, or through any other means known in the art that enables a microphone to be able to be addressed from multiple directions.

Figure 1:
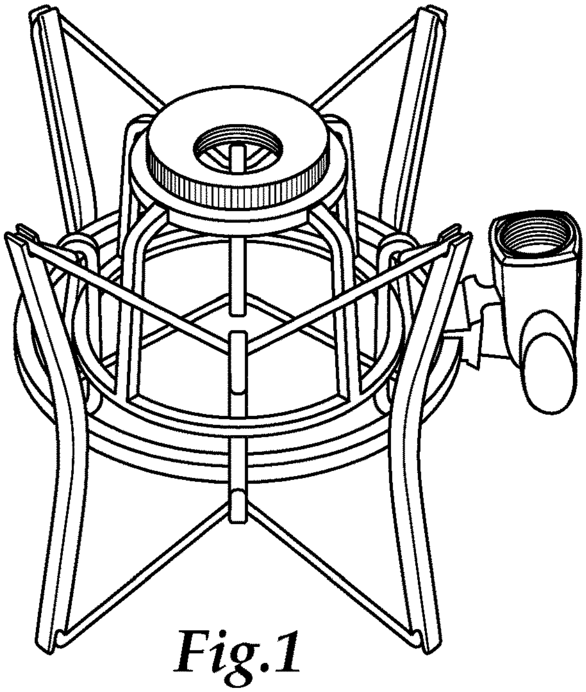
Fig.1 (PRIOR ART)
FIG. 1 illustrates a prior art microphone shock mounts.
Figure 2:
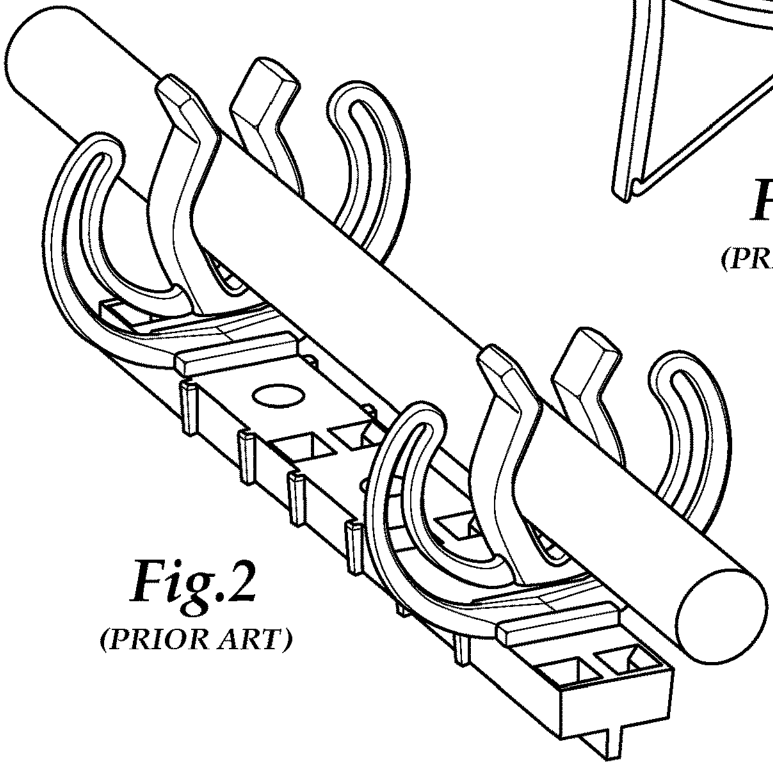
Fig.2 (PRIOR ART)
FIG. 2 illustrates a prior art microphone shock mounts.
Figure 3:
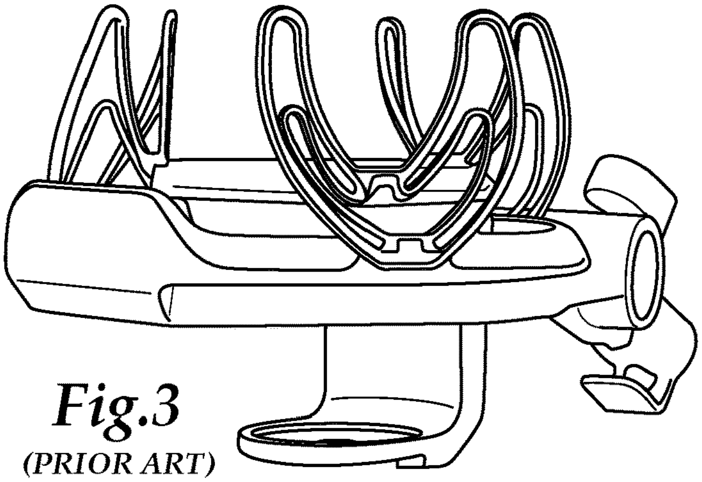
Fig.3 (PRIOR ART)
FIG. 3 illustrates a prior art microphone shock mounts.
Figure 4:
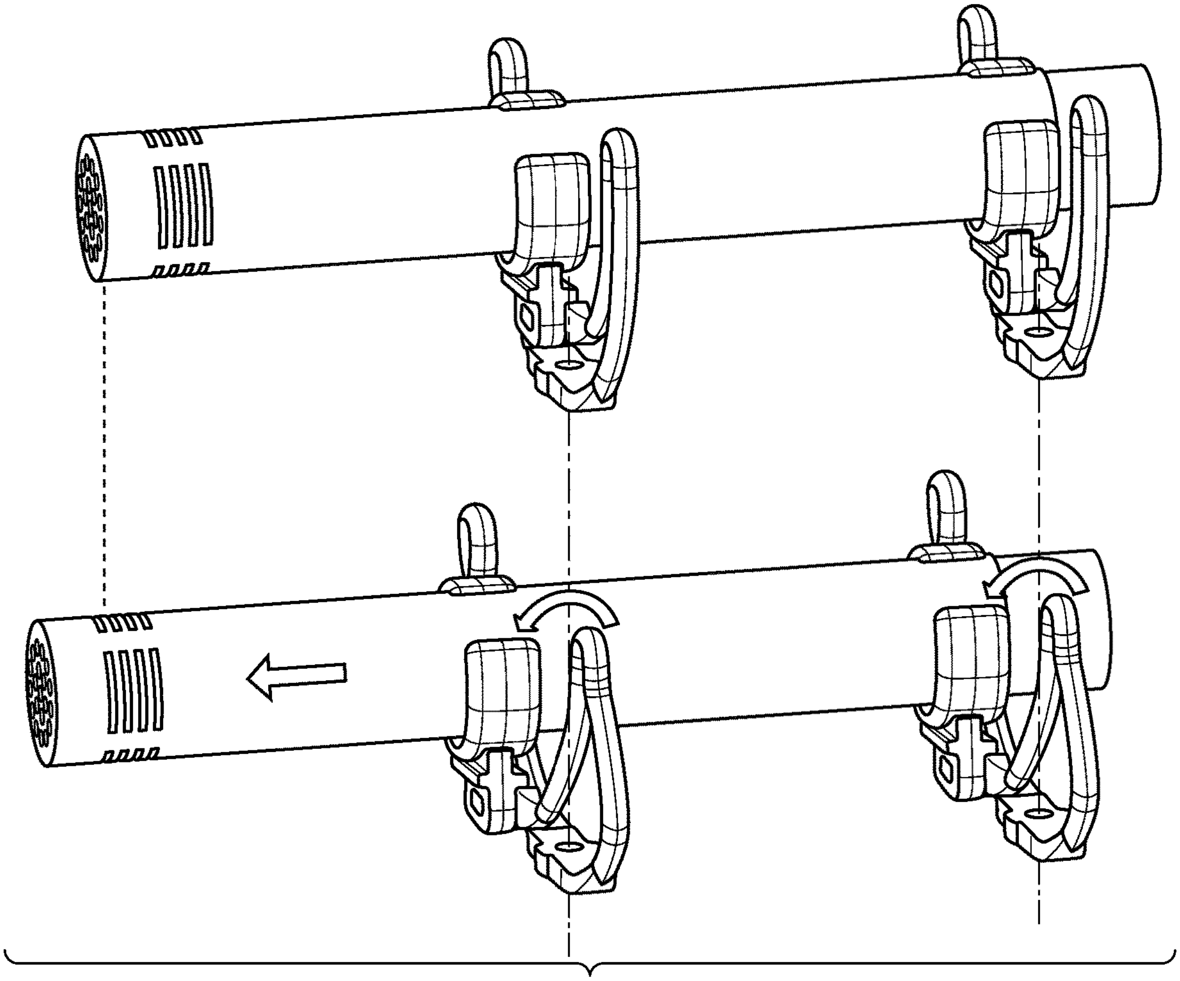
Fig.4 (PRIOR ART)
FIG. 4 illustrates the rocking motion of the prior art microphone mount shown in FIG. 1B.
Figure 5:
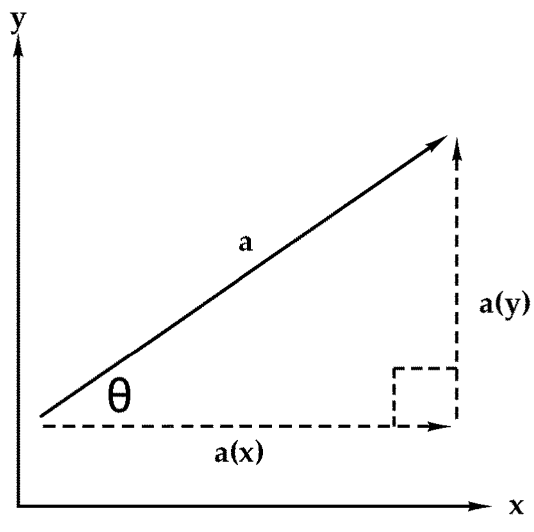
FIG. 5 illustrates a set of axes for defining of vector components.

For purposes of this application, the term "vector component" refers to a portion of a vector that extends along an axis. By way of non-limiting example and with specific reference to FIG. 5, vector "a" extends at an angle "θ" along an X-Y plane. As shown, vector components may be the X-component "a(x) and the Y-component "a(y)."

DETAILED DESCRIPTION OF THE INVENTION

Figure 6:
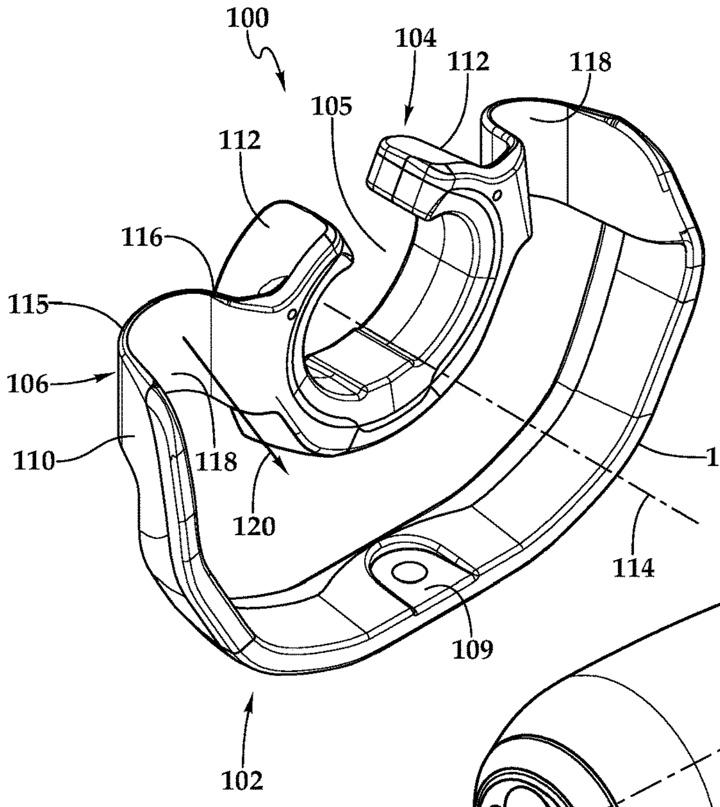
FIG. 6 illustrates an exemplary isolation mount for supporting an axial-address microphone.

Turning now to the drawings wherein like numerals represent like components, FIG. 6 illustrates an exemplary isolation mount 100 configured to, for example, mount a microphone to an object, such as a camera (not shown). Isolation mount 100 further may facilitate inhibiting, reducing, preventing, and/or at least ameliorating the transmission of kinetic energy from the object to the mounted microphone. As shown, isolation mount 100 may include a base assembly 102, a mounting assembly 104, and one or more suspension elements 106.

As shown, base assembly 102 may be U-shaped. Other shapes of base assembly 102 are contemplated including, for example, circular shaped, rectangular shaped, and the like. Moreover, base assembly 102 may include a lower section 108 and an upper section 110. As shown, lower section 108 may be configured to removably attach to an object via fastener 109. For instance, lower section 108 may be removably attached to a camera via a fastener, such as screws, nuts and bolts. Other way of attaching base assembly 102 to an object are contemplated, such as through use of clips and/or magnets.

Mounting assembly 104 may define an opening 105 configured to securely receive a microphone. More specifically, mounting assembly 104 may include C-clips or clamp elements 112 configured to encompass and/or grip a portion of a microphone. More specifically, as shown, a microphone, positioned according to address axis 114, may be mounted to isolation mount 100 via clamp elements 112 of mounting assembly 104.

Furthermore, clamp elements 112 may be adjustable to a number of variable positions to, for example, facilitate receiving microphones of various diameters. As a result, isolation mount 100 of FIG. 6 may be used universally with different brands and types of microphones.

As further shown in FIG. 6, isolation mount 100 may include one or more suspension elements 106. The height of suspension elements 106 may range between about fifteen millimeters to about thirty millimeters, and preferably between about twenty millimeters and about twenty-five millimeters. In one embodiment, suspension elements 106 may have an approximate height of about twenty-three millimeters.

The width of suspension elements 106 may range between about ten millimeters to about twenty millimeters, and preferably between about twelve millimeters and about seventeen millimeters. In one embodiment, suspension elements 106 may have an approximate width of about fifteen millimeters.

The depth of suspension elements 106 may range between about five millimeters to about fifteen millimeters, and preferably between about eight millimeters and about twelve millimeters. In one embodiment, suspension elements 106 may have an approximate depth of about ten millimeters. The thickness of suspension elements 106 may range between about half of a millimeter to about one millimeter. In one embodiment, suspension elements 16 may have an approximate thickness of about eight tenths of a millimeter.

Suspension elements 108 may be configured to extend between upper section 110 of base assembly 102 and clamp elements 112 of mounting assembly 104. More specifically, as shown, suspension elements 106 may include a first end 115 and a second end 116. First end 115 may be affixed to upper section 110 of the base 102. Second end 116 may be affixed to clamp element 112 of mounting assembly.

Suspension elements 106 may further include a rolling spring 118 between first end 115 and second end 116. Rolling spring 118 may be shaped to form an arc having an opening substantially aligned to address axis 114 of the microphone, as depicted by arrow 120. More specifically, the arc formed by rolling spring 118 may range between about 40 degrees and about 70 degrees, and preferably be about 60 degrees. While it is not necessary for first end 115 and second end 116 to be arranged perpendicular to the address axis 114, such a configuration is contemplated.

The structure of isolation mount 100 may be configured to mechanically function as a mass-spring-damper system. For instance, the mass may be the mounted microphone and rolling spring 118 of suspension element 106 may act as the spring. It is contemplated that the material and structure of suspension element 106 may facilitate inherently damping (also known as integral damping) of non-sonic vibrations. Alternatively or in addition, isolation mount 100 may further include a separate damping element (not shown) in mechanical communication with suspension element 106.

Figure 7:
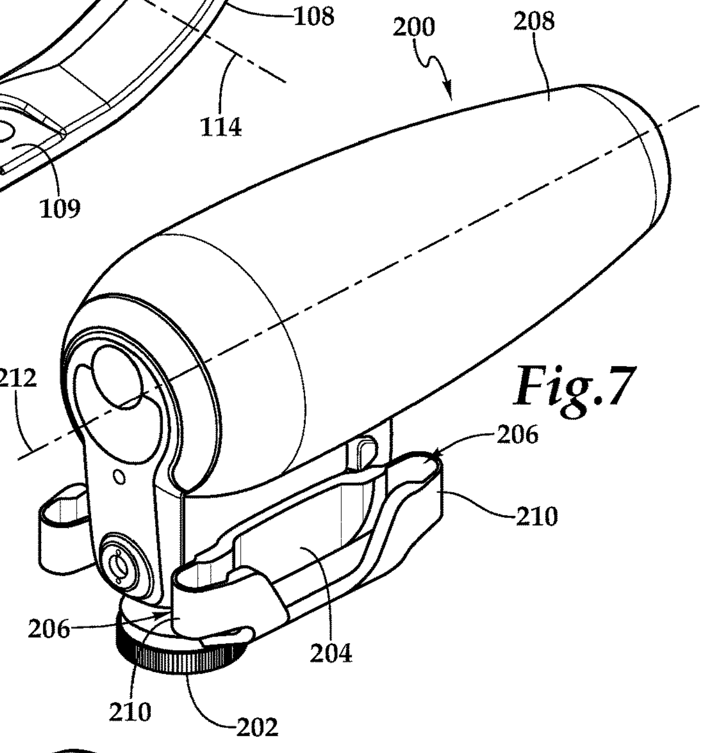
FIG. 7 illustrates another exemplary isolation mount for supporting an axial-address microphone.
Figure 8:
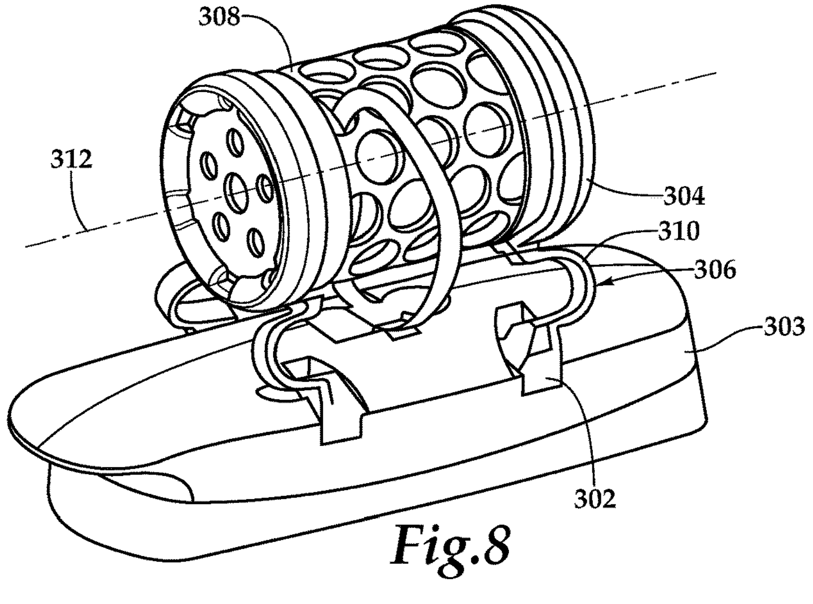
FIG. 8 illustrates yet another exemplary isolation mount for supporting a microphone.

As shown in FIG. 7 and FIG. 8, suspension elements may be used with isolation mounts of different shapes and sizes to accommodate various different microphones and base assembly connections.

For instance, FIG. 7 illustrates an exemplary isolation mount 200 that may configured to support a directional on-camera microphone 208. Isolation mount 200 may include a base assembly 202, a mounting assembly 204 defining an opening, and one or more suspension elements 206, which may be similar to suspension elements 106 of FIG. 6. As shown, suspension element 206 may include a rolling spring 210 may be shaped to form an arc having an opening substantially aligned to address axis 212 of microphone 208.

FIG. 8 illustrates an exemplary isolation mount 300 that may be configured to support a cylindrical compact microphone 308, which may, for example, accommodate USB-C devices. Isolation mount 300 may include a rectangular base assembly 302 configured to couple to block 303, a mounting assembly 304 defining an opening, and one or more suspension elements 306, which may be similar to suspension elements 106 of FIG. 6. As shown, suspension element 306 may include a rolling spring 310 may be shaped to form an arc having an opening substantially aligned to address axis 312 of the microphone 308.

Additional details regarding suspension elements and rolling spring are provided below. Although reference will be made to suspension elements 106 and rolling spring 118 of FIG. 6, it is to be understood that the same and/or similar features may be applicable and utilized by other embodiments described herein.

Exemplary Function of Suspension Elements

Figure 9A:
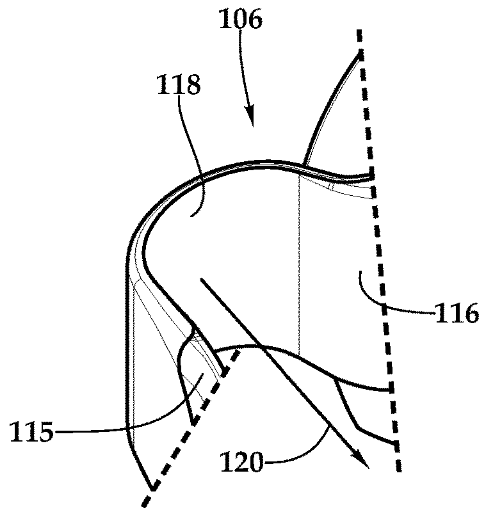
FIG. 9A illustrates an exemplary suspension element of an isolation mount.
Figure 9B:
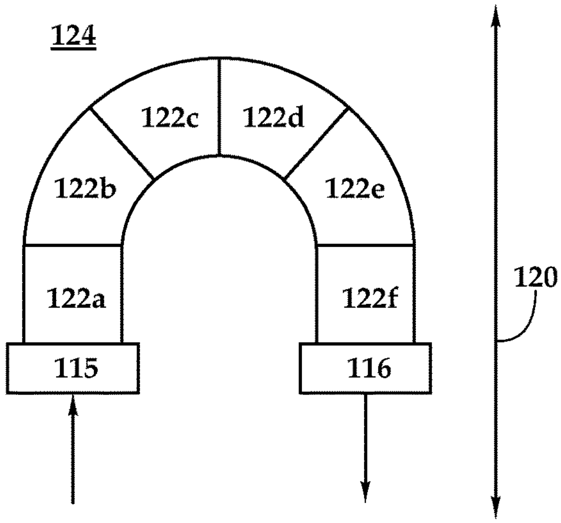
FIG. 9B illustrates the exemplary suspension element of FIG. 9A in a first position.
Figure 9C:
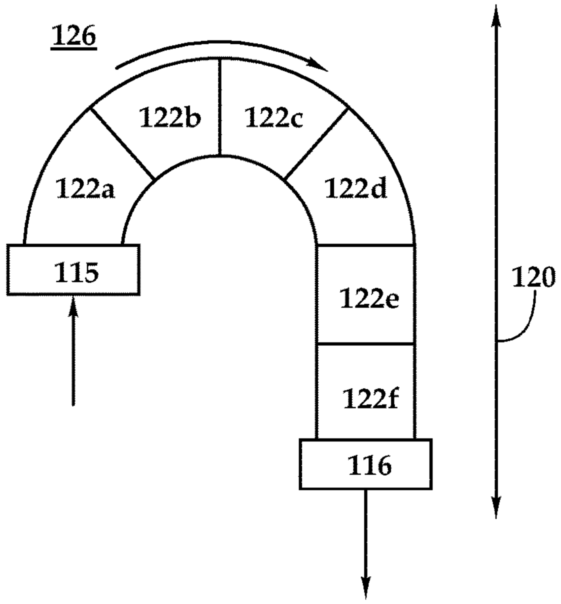
FIG. 9C illustrates the exemplary suspension element of FIG. 9A in a second position.

Exemplary functions of suspension elements 106 may include acting as a spring that undergoes "rolling flexion." More specifically, as shown in FIGS. 9A-C, first end 115 and/or second end 116 of suspension element 106 are able to move in directions orthogonal to arrow 120. Furthermore, first end 115 and/or second end 116 may be configured to move in directions substantially parallel to arrow 120.

As shown in FIG. 9B and FIG. 9C, suspension elements 106 with rolling spring 118 may be segmented into six segments 122*a-f* (It is to be understood that the segmentation is for illustrative and explanatory purposes only, and that the embodiments do not require segmentation to function). For example, the illustrated arrows extending to and from the first and second ends 115, 116, respectively, indicate the direction of relative movement of the ends 115, 116.

FIG. 9B illustrates suspension element 106 when first and second ends 115, 116 are in a first position 124. FIG. 9C illustrates first and second ends 115, 116 of suspension element 106 in a second position 126. More specifically, as illustrated in FIG. 9C, the first and second ends 115, 116 may be configured to move relative to one another and substantially parallel to arrow 120 (which may be substantially parallel to the address axis 114 of the microphone).

A comparison of FIG. 9B with FIG. 9C illustrates the flexion of rolling spring 118 may result in the arc shape "rolling along" the length of the body, as shown by segments 122*a-f* shifting positions around the arc. Without departing from the spirit and scope, it is to be understood that this 'rolling' motion may enable rolling spring 118 to absorb energy as a spring does, which may then be dissipated through damping. As a result, non-sonic vibrations that extend along address axis 114 of a mounted microphone can be absorbed and dissipated by isolation mount 100 to, for example, prevent and/or inhibit the microphone from incorrectly detecting the vibrations as sounds.

Furthermore, rolling spring 118 may be a type of spring having an inherently low internal tension. As a result of the lowered tension, rolling spring 118 may naturally possess a lowered fundamental oscillation frequency, which means that it may be induced to undergo movement (and thus 'rolling flexion') by lower-frequency non-sonic vibrations. In other words, rolling spring 118 may facilitating forming the 'spring' of a mass-spring-damper system to, for example, improve isolation of a mounted microphone from low-frequency vibrations.

Vector Components of Vibrations

It is contemplated that, non-sonic vibrations being transmitted through the object into the isolation mount 100 may not always align with address axis 114 of a mounted microphone. Nevertheless, and with reference to FIG. 5, a vector component of the non-sonic vibration may be parallel to the address axis 114 and so may be incorrectly detected as sound.

Rolling spring 118 may be configured to absorb the vector component of a non-sonic vibration that is parallel to address axis 114 of a mounted microphone. Furthermore, any remaining vector components of a non-sonic vibration may be essentially perpendicular to address axis 114. As a result, the microphone may not readily detect remaining vector components of a non-sonic vibration.

Multi-Axial Isolation

It is further contemplated that an isolation mount as shown and described herein may facilitate isolating a microphone from non-sonic vibrations in multiple directions, or from multiple vector components of a non-sonic vibration. For example, a side-address microphone, which are typically designed to pick up sounds from a plurality of co-planar directions, may benefit from isolation from non-sonic vibrations. It is noted that a microphone's ability to detect sounds from a number of directions does not affect the spirit and scope of this disclosure.

FIGS. 10A-10B illustrate an exemplary isolation mount 400 that may be used with a side-address microphone (not shown). As shown, isolation mount 400 may include a peripheral circular base assembly 402, a mounting assembly 404 defining an opening 405, and one or more suspension elements 406, which may be similar to suspension elements 106 of FIG. 6. Rather than having an address axis 114 as shown in FIG. 6, a side-address microphone may have an address plane 408, as shown in FIG. 10A.

More specifically, mounting assembly 404 of isolation mount 400 may include an inner section 410 and an outer section 412. As shown, suspension elements 406 may extend radially between outer section 412 and base assembly 402. Each suspension element 406 may include a rolling spring 414, which may be aligned with address plane 408, but opening in different directions. The positioning of suspension element 406 facilitates absorbing non-sonic vibrations along their respective opening directions (represented by array of arrows 416 of FIG. 10B). In other words, by providing an array of suspension elements 406, non-sonic vibrations from a plurality of directions that lie substantially along address plane 408 may be absorbed and dissipated.

Although not shown, it is contemplated that multi-axial isolation may be provided through a combination of two or more aspects disclosed above. For example, an isolation mount may include a base assembly configured to attach to an object, a mounting assembly, a connector, and two suspension elements. A rolling spring of a first suspension element may form an arc opening in a first direction, while a rolling spring of a second suspension element may form an arc opening in a second, substantially perpendicular direction. Each of the first and second suspension elements may be configured to absorb non-sonic vibrations travelling in either the first or second direction (or along the plane formed by the first and second directions).

Furthermore, a multi-axial isolation mount may include a second connector and a third suspension element between the base assembly and the mounting assembly. The third suspension element may include a rolling spring forming an arc opening in a direction substantially perpendicular to the first and second suspension elements. As a result of the three substantially perpendicularly positioned suspension elements, a multi-axial isolation mount may facilitate three-dimensional isolation of a mounted microphone.

Improved Sensitivity for Low-Amplitude Isolation

FIGS. 11-13 illustrate exemplary isolation mounts having improved sensitivity for low-amplitude isolation. As shown in FIG. 11, exemplary isolation mount 500 may include a base assembly 502, a mounting assembly 504 defining an opening 505, and two suspension elements 506, 508, positioned on either side of mounting assembly 504. Each suspension element 506, 508 may be similar to suspension elements 106 of FIG. 6 as detailed above.

More specifically, each suspension element 506, 508 may include a rolling spring 510, 512. As shown, rolling springs 510, 512 may be arranged to form arcs opening in substantially opposing directions as indicated by opposing arrows 514, 516. As illustrated in FIG. 11, the opposing rolling spring bodies 510, 512 may be arranged to overlay vertically one another.

FIG. 12 illustrates another exemplary isolation mount 600. As shown, isolation mount 600 includes base assemblies 602, mounting assemblies 604 defining an opening for receiving microphone 608, and suspension elements 606. Each suspension element 606 may include opposing rolling springs 610, 612. Opposing rolling springs 610, 612 may be substantially coplanar and arranged to form arcs opening in substantially opposing directions as indicated by opposing arrows 614, 616.

FIG. 13 illustrates yet another exemplary isolation mount 700. As shown, isolation mount 700 includes base assembly 702, mounting assemblies 704 defining an opening 705 for receiving microphone 708, and suspension elements 706. Suspension elements 706 may include opposing rolling springs 710, 712. As illustrated, isolation mount 700 may be coplanar, but not necessarily coaxial, with address axis 714. Nevertheless, isolation mount 700 may be configured to function as detailed above. In particular, isolation mount may be configured to have a lowered resonant frequency, provide a high level of compliance (and therefore isolation) in at least one direction without sacrificing the ability of the mount to support the microphone, and provide a greater degree of energy absorption. Other variations and arrangements may exist, and the skilled person will appreciate that such variations are within the scope of the invention. The skilled person will further appreciate that this embodiment may be used in conjunction with any other embodiment disclosed herein.

With regard to FIGS. 11-13, rolling springs, as detailed above, may be configured to more readily respond to and flex in response to non-sonic vibrations extending from a particular direction along the address axis and/or address plane. As a result, although rolling springs may absorb and dissipate non-sonic vibrations from various directions along the address axis and/or address plane, which may be more sensitive to a particular direction. As such, providing at least a pair of rolling springs opening in opposing directions may improve sensitivity in directions along the address axis and/or address plane. As a result, isolation mounts may provide improved utility when applied to highly sensitive microphones. Furthermore, isolation mounts, as shown and described herein, also may provide improved stability to a mounted microphone, particularly when opposed pair of rolling springs are longitudinally spaced apart from one another.

FIG. 14 illustrates a front view of an exemplary isolation mount 800. As shown, isolation mount 800 may include a base assembly 802, mounting assembly 804 defining an opening 805, and suspension elements 806. Each suspension element 806 may include a rolling spring 808 having a first end 810 and a second end 812.

Further, suspension element 806 may be substantially coplanar with an address axis 814 of a microphone. In other words, the plane of rolling spring 808, depicted by the dashed line 816, may be aligned with the address axis 814. This may be contrasted against isolation mount 200 of FIG. 7, which illustrates suspension element 206 not coplanar with the address axis 212.

Isolation mount 800 of FIG. 14 may further improve isolation of a microphone from non-sonic vibrations, providing improved utility to, for example, highly-sensitive microphones. With reference to FIG. 7, which illustrates the plane of rolling spring 210 not aligned with the address axis 212, as the skilled person will appreciate the rolling flexion of rolling spring 210 may induce a moment a first or a second end of rolling spring 210 or within rolling spring 204. This offset may inhibit the complete absorption and subsequent dissipation (or damping) of non-sonic vibrations by the suspension element 206. As a result, isolation mount 200 may provide substantial isolation for the majority of microphones as the rolling flexion of the suspension element 206 may still provide substantial absorption and dissipation of non-sonic vibrations, as the diaphragm of such microphones may not be sensitive enough to pick up the significantly reduced amplitude of the non-sonic vibrations. However, more sensitive microphones, such as those designed or configured to pick up subtle sounds having a very low amplitude may require improved isolation, such as through use of isolation mount 800 of FIG. 14.

Referring back to FIG. 14, the absence of an induced moment about first end 810 and/or second end 812 or within rolling spring 808 may enable a greater degree of absorption and subsequent dissipation (or damping) of non-sonic vibrations by suspension element 806. As a result, isolation mount 800 may facilitate providing improved isolation from non-sonic vibrations. The skilled person will appreciate that elements of each exemplary isolation mount disclosed herein may be used interchangeably.

FIG. 15A-15B illustrate exemplary isolation mounts 900, 1000. As shown in FIG. 15A, isolation mount 900 may include two rolling springs 902, 904 that overlay one another. Rolling springs 902, 904 may be arranged such that each is individually coplanar with an address axis 906 of a mounted microphone. FIG. 15B illustrates isolation mount 1000 including two rolling spring 1002, 1004, which may be arranged such that the average of its planes 1008, 1010 of each the rolling springs 1002, 1004 may be coplanar with the address axis 1006. As a result, the induced moments around a first and/or second end of rolling springs 1002, 1004 may be configured to cancel each other out.

It is further contemplated that isolation mounts, such as those described herein, may comprise suspension elements arranged on either side of a microphone. As such, it is not necessary for suspension elements on either side of the microphone to be coplanar with one another. Rather, they may be configured to be coplanar with an address axis of the microphone.

Providing Longitudinal Support

FIGS. 16-20 illustrate exemplary systems including two isolation mounts that may configured to, for example, facilitate providing longitudinal support to a microphone. FIG. 16 illustrates a system 1100 including a first isolation mount 1102 separate from a second isolation mount 1104 to provide extended support and stability to a microphone 1106 that may be too large or unwieldy to be supported by a single isolation mount. As shown in system 1200 of FIG. 17, first and second isolation mounts 1202, 1204 may share a common base 1206 and/or a common mounting assembly 1208.

FIG. 18 illustrates an exemplary system 1300 including two isolation mount 1302, 1304 having a first mounting assembly 1306 separate from a second mounting assembly 1308. Each isolation mount 1302, 1304 may include suspension elements 1312 with a rolling spring 1314. As shown, mounting assemblies 1306, 1308 may share a common base 1310. Furthermore, first isolation mount 1302 may be arranged in an opposing direction to a rolling spring 1314 of second isolation mount 1308.

Furthermore, FIGS. 19-20 illustrates exemplary systems 1400, 1500 combining one or more of the features shown and described herein. For instance, FIG. 19 shows system 1400 including two isolation mount 1402, 1404, each isolation mount 1402, 1404 having a suspension element 1406 with opposing rolling springs 1408, 1410. FIG. 20 shows system 1500 including two isolation mount 1502, 1504, each isolation mount 1502, 1504 having suspension elements 1510 at least two rolling springs 1506, 1508 arranged to form arcs opening in substantially opposing directions.

Ribbon Structure to Improve Compliance

It is further contemplated that isolation mounts, such as those shown and described herein, may include suspension elements that may be formed from a flattened suspension ribbon, wherein the ribbon width may be oriented substantially perpendicular to the address axis. Such isolation mounts may facilitate increasing the compliance of the suspension element in directions parallel to the address axis, which may provide a decrease in the resonant frequency of the suspension element. This may result in an improved isolation of the microphone received by the isolation mount from non-sonic vibrations. It is further contemplated that formation of the suspension element into a ribbon may result in the strength of the suspension element- and ability to support stably a mounted microphone—to be maintained or even improved.

It is further contemplated that a ribbon-type suspension element may be configured to absorb non-sonic vibrations (or a vector component thereof) that are substantially parallel to the address axis through rolling flexion. For instance, a first end and a second end of a suspension element may move in directions parallel to one another, without their perpendicular separation distance appreciably changing. With this rolling motion, the radius of the arc may not appreciably change. Rather, the suspension element may roll as it curls and uncurls in equal proportion due to parallel movement of the first and second ends. As a result, ribbon-type suspension elements, such as those shown in FIGS. 21-23, may provide an isolation mount with a high degree of movement or freedom along the address axis. This may enable the preferential, sensitive, and substantial inhibition of non-sonic vibrations, by the microphone diaphragm, along the address axis.

It is further contemplated that non-sonic vibrations (or a vector component thereof) which are perpendicular to the address axis and normal to a surface of the ribbon are absorbed through contractive/expansive flexion of the suspension element. This may allow for a first end and a second end of the suspension element moving closer together (or further apart) relative to each other, such that the suspension element may be considered to close or open, respectively. As a result, the radius of the formed arc of the rolling spring may change as the suspension element flexes open or closed. Further, the suspension element will be more resilient to such an action, and so the isolation mount will have a lesser degree of freedom of movement in these directions. The suspension element may therefore have a lower compliance in these directions, and so may be less able to isolate the mounted microphone from non-sonic vibrations along this axis. In at least one embodiment, such a configuration is contemplated to provide the high degree of compliance along the address axis—being the most desired axis for high compliance—without sacrificing the structural stability of the isolation mount.

It is further contemplated that non-sonic vibrations (or a vector component thereof) in a direction perpendicular to both directions disclosed above are absorbed through torsion of the suspension element, whereby the suspension element twists along its length. The suspension element may have the highest resilience against movement along this axis and may be configured to strongly resist torsion, and so the isolation mount will have minimal degree of freedom of movement in this direction. As a result, the isolation mount may have minimal, lowered or almost negligible ability to absorb and subsequently dissipate non-sonic vibrations in these directions. In at least one embodiment, such a configuration is contemplated as this particular direction may be aligned with the vertical axis—and therefore, the isolation mount needs a high degree of strength and stiffness to support the weight of the microphone.

Long Ribbon Structure

In addition to the advantages detailed above for ribbon-type suspension elements, FIGS. 21-24 illustrate isolation mounts including long ribbon suspension elements that may be configured to couple with a mount assembly and a base assembly, which may have a reduced surface area to, for example, further minimize unwanted resonance. In addition, long ribbon structure may facilitate clearing cables via microphones via side-exit sockets.

Long ribbon suspension elements may be made from a stiffer injection mold resin (e.g., plastic) to, for example, balance (support and isolate) a wide range of microphones. The stiffness of resin may range. For instance, a flexural modulus may range from about 200 MPa to about 1500 MPa, and preferably about 550 MPa to about 1150 MPa. Although other resin stiffness is contemplated, a long ribbon structure with stiffer resins may eliminate the need to add a damper element. In other words, the resins viscous properties of long ribbon suspension elements may be configured to absorb energy, which may then be converted to heat.

The height of long ribbon suspension elements may range between about thirty millimeters to about sixty millimeters, and preferably between about forty millimeters and about fifty millimeters. In one embodiment, long ribbon suspension elements may have an approximate height of about forty-five millimeters.

The width of long ribbon suspension elements may range between about five millimeters to about twenty millimeters, and preferably between about eight millimeters and about twelve millimeters. In one embodiment, long ribbon suspension elements may have an approximate width of about ten millimeters.

The thickness of long ribbon suspension elements may range between about a quarter of a millimeter to about two millimeters, and preferably between about half of a millimeter and about one and a half millimeters.

The depth of long ribbon suspension elements may range between about five millimeters to about twenty millimeters, and preferably between about ten millimeters and about fifteen millimeters. In one embodiment, long ribbon suspension elements may have an approximate depth of about fourteen millimeters.

Referring now to FIG. 21, an exemplary isolation mount 1600 is illustrated. Isolation mount 1600 may be configured to support a cantilevered microphone having a windshield or wind-jammer. As shown, isolation mount 1600 may include a base assembly 1602, mounting assembly 1604 defining an opening 1605, a pair of front long ribbon suspension elements 1606, and a pair of rear long ribbon suspension elements 1608. Suspension elements 1606, 1608 may extend between base assembly 1602 and mounting assembly 1604.

Mounting assembly 1604 may be structured to allow a user to access easily buttons on a microphone. In particular, mounting assembly 1604 may include C-clips 1614 to, for example, receive a microphone having a diameter ranging from about fifteen millimeters to about thirty millimeters, and preferably between about twenty-two millimeters to about twenty-three millimeters.

The height of isolation mount 1600 may range between about forty millimeters to about fifty millimeters. In one embodiment, isolation mount 1600 may have an approximate height of about forty-six millimeters. The length of isolation mount 1600 may range between about fifty millimeters to about seventy millimeters. In one embodiment, isolation mount 1600 may have an approximate length of about sixty-eight millimeters.

The width of isolation mount 1600 may range between about forty millimeters to about seventy millimeters, and preferably between about fifty millimeters and about sixty millimeters. In one embodiment, isolation mount 1600 may have an approximate width of about fifty-eight millimeters.

As shown in FIG. 21, front and rear long ribbon suspension elements 1606, 1608 may be coupled for better stability and to, for example, facilitate easy assembly. Further, each pair of long ribbon suspension elements 1606, 1608 may include two rolling springs 1610, 1612 that may be angled and/or opposing one another. It is contemplated that each pair of long ribbon suspension elements 1606, 1608 may have the same thickness. Alternatively, long ribbon suspension elements 1606, 1608 may have a different thickness. For instance, front suspension elements 1606 may have a thickness of about one millimeter and rear suspension elements 1608, may have a thickness of about one and four tenths millimeters.

In addition, suspension elements 1606, 1608 may have varying stiffness, such as flexible, medium and/or stiff. In one example, front suspension element 1606 may be less stiff as compared to rear suspension elements 1608. If stiffness of front and rear suspension elements 1606, 1608 is matched to a given microphone and its center of gravity/mass, excitation vertically and also to the side, centered around a certain key frequency range, may result in a neutral zone where motion/deflection is reduced. Deflection to the extremities of the microphone may be high but the neutral zone, where the sensitive capsule diaphragm (pick-up) element is located remains fairly stable as mechanical induced noise and/or vibration may be reduced.

FIG. 22 illustrates another exemplary isolation mount 1700 configured to, for example, support a cantilevered microphone. As shown, isolation mount 1700 may include a front and rear base assembly 1702, 1704, a front and rear mounting assembly 1706, 1708, and a pair of front long ribbon suspension elements 1710 and a pair of rear long ribbon suspension elements 1712. As shown, each mounting assembly 1706, 1708 may be a single, unitary support defining an opening 1705 for receiving the microphone.

The height of isolation mount 1700 may range between about forty millimeters to about fifty millimeters. In one embodiment, isolation mount 1700 may have an approximate height of about forty-six millimeters. The width of isolation mount 1700 may range between about forty millimeters to about seventy millimeters, and preferably between about fifty millimeters and about sixty millimeters. In one embodiment, isolation mount 1700 may have an approximate width of about fifty-eight millimeters.

The length of isolation mount 1700 may be adjustable depending on, for example, where base assemblies 1702, 1704 are coupled to a block 1703. For instance, the length of isolation mount 1700 may range between about fifty millimeters to about seventy millimeters. In one embodiment, isolation mount 1700 may have an approximate length of about sixty-eight millimeters.

As shown in FIG. 22, front and rear long ribbon suspension elements 1710, 1712 may be separated for tooling purposes and for allowing a user to visualize graphics and access buttons on the microphone. Further, each pair of long ribbon suspension elements 1710, 1712 may include two rolling springs 1714, 1716. As shown, rolling springs 1714, 1716 may be angled and/or opposing one another.

Suspension elements 1706, 1708 may have varying levels of stiffness, such as flexible, medium and/or stiff. It is further contemplated that each pair of long ribbon suspension elements 1706, 1708 may have the same thickness. Alternatively, long ribbon suspension elements 1706, 1708 may have a different thickness. For instance, front suspension elements 1706 may have a thickness of about one millimeter and rear suspension elements 1708, may have a thickness of about one and four tenths millimeters. Other thicknesses are contemplated.

FIG. 23 illustrates another exemplary isolation mount 1800. As shown, isolation mount 1800 may include a front and rear base assembly 1802, 1804, front and rear adjustable mounting assemblies 1806, 1808, and a pair of front long ribbon suspension elements 1810 and a pair of rear long ribbon suspension elements 1812. Mounting assemblies 1806, 1808 may define an opening 1805 for receiving a microphone.

The height of isolation mount 1800 may range between about fifty millimeters to about sixty millimeters, and preferably between about fifty-two millimeters and about fifty-five millimeters. The width of isolation mount 1800 may range between about forty millimeters to about seventy millimeters, and preferably between about fifty millimeters and about sixty millimeters. In one embodiment, isolation mount 1800 may have an approximate width of about fifty-eight millimeters.

Similar to isolation mount 1700 of FIG. 22, the length of isolation mount 1800 may be adjustable depending on, for example, where base assemblies 1802, 1804 are coupled to a block 1803. For instance, the length of isolation mount 1800 may range between about forty millimeters to about eighty millimeters, and preferably between about fifty millimeters and about sixty millimeters.

As shown in FIG. 23, each mounting assembly 1806, 1808 may include a toggle 1814, 1816 for adjusting a diameter of opening 1805. Toggles 1814, 1816 may be configured in an open position or a closed position to facilitate supporting microphones of various diameters. For example, toggles 1814, 1806 may be configured to adjust to microphones having a diameter ranging between about fifteen millimeters to about thirty millimeters, and preferably between about eighteen millimeters and twenty-three millimeters.

Further, front and rear long ribbon suspension elements 1810, 1812 of isolation mount 1800 may be separated for tooling purposes and for allowing a user to visualize graphics and access buttons on the microphone. As shown, each pair of long ribbon suspension elements 1810, 1812 may include two rolling springs 1818, 1820. Rolling springs 1818, 1820 may be angled and/or opposing one another.

Suspension elements 1806, 1808 may have varying levels of stiffness, such as flexible, medium and/or stiff. It is further contemplated that each pair of long ribbon suspension elements 1806, 1808 may have the same thickness. Alternatively, long ribbon suspension elements 1806, 1808 may have a different thickness. For instance, front suspension elements 1806 may have a thickness of about one millimeter and rear suspension elements 1808, may have a thickness of about one and four tenths millimeters. Other thicknesses are contemplated.

FIG. 24 illustrates yet another exemplary isolation mount 1900 configured to support, for example, a cantilevered or shotgun microphone 1914. As shown, isolation mount 1900 may include a base assembly 1902 for coupling with a block 1903, mounting assembly 1904 defining an opening 1905, and a pair of front long ribbon suspension elements 1906 and a pair of rear long ribbon suspension elements 1908. Suspension elements 1906, 1908 may be configured to couple with mounting assembly 1904.

The height of isolation mount 1900 may range between about thirty millimeters to about fifty millimeters, and preferably between about forty millimeters and about forty-five millimeters. The length of isolation mount 1900 may range between about thirty millimeters to about sixty millimeters, and preferably between about thirty-five millimeters and about fifty-five millimeters. The width of isolation mount 1900 may range between about forty millimeters to about sixty millimeters, and preferably between about forty-five millimeters and about fifty-five millimeters. In one embodiment, isolation mount 1900 may have an approximate width of about fifty millimeters.

As shown in FIG. 24, front and rear long ribbon suspension elements 1906, 1908 may be coupled for improved stability and support of a microphone 1914. Further, each pair of long ribbon suspension elements 1906, 1908 may include two rolling springs 1910, 1912 that may be angled and/or opposing one another. It is contemplated that each pair of long ribbon suspension elements 1906, 1908 may have the same thickness. Alternatively, long ribbon suspension elements 1906, 1908 may have a different thickness. For instance, front suspension elements 1906 may have a thickness of about one millimeter and rear suspension elements 1908, may have a thickness of about eight tenths of a millimeter.

When used in the context of 'substantially parallel' or 'substantially perpendicular', the term substantially should be regarded as permitting an angular deviation from the stated alignment, insofar as the working of the invention is still enabled, without departing from the scope of the invention.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. An isolation mount for a microphone having an address axis, said isolation mount comprising:
- a base;
- a mounting assembly configured to receive the microphone;
- a suspension element extending between the base and the mounting assembly, said suspension element comprising a first end affixed to the base, a second end affixed to the mounting assembly;
- a rolling spring extending between said first end and said second end of said suspension element; and
- wherein the rolling spring is arranged to form an arc having an opening substantially aligned to the address axis of the microphone.

2. The isolation mount of claim 1, wherein said suspension element further comprising:
- a first rolling spring and a second rolling spring; and
- said first and second rolling spring are arranged such that their respective arc openings are substantially aligned to the address axis of the microphone in opposing directions.

3. The isolation mount of claim 2, wherein the first rolling spring is positioned substantially above the second rolling spring.

4. The isolation mount of claim 2, wherein the first rolling spring is substantially coplanar with the second rolling spring.

5. The isolation mount of claim 1, wherein the rolling spring is configured such that the formed arc is substantially coplanar with the address axis.

6. The isolation mount of claim 2, wherein the first and second rolling springs are configured such that their respective formed arcs are individually coplanar with the address axis.

7. The isolation mount of claim 2, wherein the first and second rolling spring are configured such that a first moment induced within the first rolling spring is substantially cancelled by a second, opposing moment induced within the second rolling spring.

8. The isolation mount of claim 1, further comprising a plurality of suspension members, each suspension member having a rolling spring, each suspension member extending between the base and the mounting assembly and arranged such that the arc openings of each respective rolling spring is aligned with the address plane in an array of directions.

9. The isolation mount of claim 8, wherein the plurality of suspension elements are radially arranged about the mounting assembly.

10. The isolation mount of claim 8, wherein the plurality of suspension elements are arranged in a nested configuration, whereby a sequential chain is formed by the plurality of suspension elements between the base and the mounting assembly.

11. The isolation mount of claim 1, wherein the suspension element is a ribbon having a width oriented substantially perpendicular to the address axis.

12. The isolation mount of claim 1, wherein said mounting assembly includes a toggle for adjusting a diameter of an opening configured to received the microphone.

13. The isolation mount of claim 2, wherein said first rolling spring is angled in relation to said second rolling spring.

14. The isolation mount of claim 2, wherein said first rolling spring and said second rolling spring are positioned on opposing sides of said mounting assembly.

15. The isolation mount of claim 1, wherein a height of said suspension element is between about forty millimeters and about fifty millimeters.

16. The isolation mount of claim 2, wherein a thickness of each rolling spring is between about eight tenths of a millimeter and about one and a half millimeters.

17. A system comprising two or more isolation mounts for a microphone having an address axis, each isolation mount comprising:

a base;

a mounting assembly configured to receive the microphone;

a suspension element extending between the base and the mounting assembly, said suspension element comprising a first end affixed to the base, a second end affixed to the mounting assembly;

a rolling spring extending between said first end and said second end of said suspension element; and wherein the rolling spring is arranged to form an arc having an opening substantially aligned to the address axis of the microphone.

18. The isolation mount of claim 12, wherein said first isolation mount and said second isolation mount are configured to support a microphone at multiple points along the address axis.

19. The isolation mount of claim 12, wherein the first and second isolation mounts share a common base.

20. The isolation mount of claim 8, wherein the first and second isolation mounts share a common mounting assembly.

* * * * *